(12) United States Patent
Robert et al.

(10) Patent No.: US 8,742,358 B2
(45) Date of Patent: Jun. 3, 2014

(54) PHOTONIC RADIATION DETECTION DEVICE, AND METHODS FOR DIMENSIONING AND OPERATING SUCH DEVICE

(75) Inventors: Charlotte Robert, Grenoble (FR); Guillaume Montemont, Grenoble (FR); Veronique Rebuffel, Corenc (FR)

(73) Assignee: Commissariat a l'Energie et aux Energies Alternatives, Paris (FR)

( * ) Notice: Subject to any disclaimer, the term of this patent is extended or adjusted under 35 U.S.C. 154(b) by 340 days.

(21) Appl. No.: 13/022,331

(22) Filed: Feb. 7, 2011

(65) Prior Publication Data

US 2011/0204245 A1    Aug. 25, 2011

(30) Foreign Application Priority Data

Feb. 8, 2010    (FR) ...................................... 10 00499

(51) Int. Cl.
    *G01T 1/24*    (2006.01)
(52) U.S. Cl.
    USPC .................................................... 250/370.08
(58) Field of Classification Search
    USPC ......................................... 250/370.08, 363.1
    See application file for complete search history.

(56) References Cited

U.S. PATENT DOCUMENTS

| 4,047,037 | A | * | 9/1977 | Schlosser et al. | ......... | 250/370.09 |
| 5,448,073 | A | * | 9/1995 | Jeanguillaume | ......... | 250/363.02 |
| 5,489,782 | A | * | 2/1996 | Wernikoff | ..................... | 250/369 |
| 7,274,022 | B2 | * | 9/2007 | Soluri et al. | ............... | 250/363.1 |
| 7,663,111 | B2 | * | 2/2010 | Shahar et al. | ............... | 250/363.1 |
| 2003/0107000 | A1 | * | 6/2003 | Yamashita et al. | ........ | 250/363.03 |

OTHER PUBLICATIONS

Cunningham et al., "Signal-to-noise optimization of medical imaging systems", *Optical Society of America*, vol. 16, No. 3, Mar. 1999, p. 621-632.
Formiconi et al., "Study of High-Energy Multihole Collimators", *IEEE Transaction on Nuclear Science*, vol. 49, No. 1, Feb. 2002, p. 25-30.
Montémont et al., "CZT Piel Detectors for Improved SPECT Imaging", 2008 *IEEE Nuclear Science Symposium Conference Record*, p. 84-89.
Starck et al., "The use of defective quantum efficiency (DQE) in evaluating the performance of gamma camera systems", *Physics in Medicine and Biology*, 50 (2005) p. 1601-1609.
Warburton, "An Approach to Sub-Pixel Spatial Resolution in Room Temperature X-Ray Detector Arrays with Good Energy Resolution", *X-ray Instrumentation Associates*, 1988, 5 pgs.

* cited by examiner

*Primary Examiner* — David Porta
*Assistant Examiner* — Edwin Gunberg
(74) *Attorney, Agent, or Firm* — Brinks Gilson & Lione

(57) ABSTRACT

A photonic radiation detection device includes a collimator, a detector, means for localization in the detection plane defining on the one hand the partitioning of the detection plane in physical or virtual pixels of transversal dimensions smaller than those of the collimator channels, and associating on the other hand one of said pixels to each photon interaction. The detection device has at least in one previously selected acquisition configuration, a degree of pixelation in the detection plane greater than 1 and a collimator-detector distance (c) greater than one tenth of the septal height (h) of the collimator. A method for dimensioning such a device includes, for at least one given spatial frequency, calculating and comparing merit indicator values for different acquisition configurations of a structural model of the detection device.

9 Claims, 4 Drawing Sheets

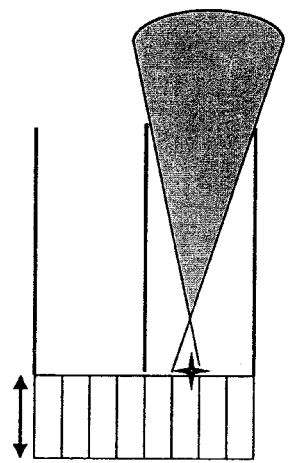
Fig. 3
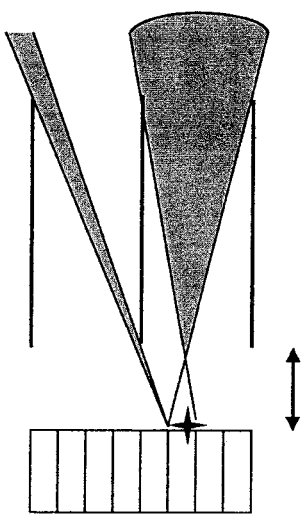
Fig. 4
Fig. 5

PHOTONIC RADIATION DETECTION DEVICE, AND METHODS FOR DIMENSIONING AND OPERATING SUCH DEVICE

PRIORITY CLAIM

This application claims priority to French Patent Application No. 1000499, filed Feb. 8, 2010, the subject matter of which is incorporated by reference herein.

TECHNICAL FIELD

The present invention relates to a photonic radiation detection device. This kind of detection device is used especially in the domains of medical imaging, astronomic imaging, the nuclear field and industrial inspection. The detection device according to the invention is more specifically adapted for medical imaging. This type of device can be integrated in a medical gamma camera, for instance a gamma camera used for scintigraphy in association with the radio isotope $^{99m}$Tc.

BACKGROUND

Known gamma cameras comprise detection devices consisting mainly of a detector, a collimator and data processing means.

The detector can comprise a scintillator material, such as cesium iodide, for instance CsI(Tl), sodium iodide, for instance NaI(Tl), lanthanum bromide (LaBr$_3$) or bismuth germanate (BGO), in association with photo detectors, for instance a matrix of photo diodes, specifically avalanche photo diodes, a CCD matrix or a CMOS sensor. They are called scintillating detectors. The thickness of the scintillating material is in general between a few μm and a few mm. When a photon penetrates in the scintillator material and interacts with it, it produces photons of lower energy, in general in the visible spectrum. These photons are then collected by at least one photo detector coupled to the scintillator material, then transformed in an exploitable electrical signal. A scintillating detector comprises usually a plurality of pixels, each pixel corresponding with at least one photo diode, or at least one pixel of a CCD or CMOS matrix.

Alternatively, the detector comprises at least a semi-conductor detector material, susceptible of being polarized by a cathode and an anode. These electrodes are in general arranged on two opposite faces of the semi-conductor material. This type of detector is called a semi-conductor detector. When a photon penetrates in the semi-conductor material and interacts with it, all or part of its energy is transferred to charge carriers in the semi-conductor material. Since the detector is polarized, the charge carriers migrate towards the electrodes (the anode). They produce then an electrical signal at the terminals of the electrodes. The energy of this electrical signal is proportional with the energy deposited by the photon during the interaction. The electrical signal is collected and then processed. Depending on the nature of the detector, the signal is collected only at the anode (most frequent case), only at the cathode, or at both electrodes. A semi-conductor detector comprises usually a plurality of physical pixels, and each physical pixel corresponds with a charge collection circuit of one electrode.

The collimator allows for a selection of the photons arriving at the detector. It is formed by channels delimited by fine walls called septas. These channels (or more precisely the corresponding holes) can have a circular, hexagonal or square section; they can be parallel, divergent or convergent.

Known gamma cameras can be used either in planar mode, or in tomographic mode. In planar mode, acquisition takes place according to only one angle of view, the head of the camera remains fixed during the whole examination. The projection and therefore the reconstructed image have the inconvenience of not integrating any information about the location and depth of the radioactive elements distributed in the patient. In tomographic mode, the head of the camera, comprising the detector and the collimator, describes a circular or elliptic orbit around the patient and a plurality of projections are acquired at different view angles. Reconstruction techniques are then employed in order to create images that can be interpreted by the practitioner. With the tomographic mode, specific information can be obtained about location and depth of the radioactive elements distributed in the patient.

The performance of detection devices is usually characterized by a certain number of parameters, among which:

1) the spatial resolution, which corresponds with the minimum distance between the two point sources that can be discerned on a planar image (image resulting from projection under only one angle of view) or on a reconstructed image (starting from several projections). Spatial resolution is usually given by the width at mid-height of the punctual or linear dispersion function (obtained by imaging a punctual or linear source, respectively). The spatial resolution is the result of the intrinsic spatial resolution of the detector and the geometric spatial resolution of the collimator;

2) the energy resolution, which illustrates the capacity of a detection device to precisely select photons in function of their energy. It is expressed in percent and is given by the width at mid-height $\Delta E$ of the energy response of the device for the energy emission E of the source (in other words of the used radio isotope);

3) the sensitivity, also called effectiveness. Sensitivity can be defined by the relationship between the number of primary photons detected (photons that have not undergone any interaction before reaching the detector material) and the total number of photons emitted by the source over $4\pi$ steradians. The sensitivity depends on the effectiveness of the detector (arresting power of the detector material) and the geometric effectiveness of the collimator (which is low because the collimator imposes a strong spatial selection of photons and, because of this, absorbs the majority of them). The lower the sensitivity of a detection device, the longer the acquisition time must be in order to obtain satisfactory statistics about the acquired projections.

As a general rule, these parameters vary inversely: the improvement of one parameter leads to the degradation of one or more other parameters. This is for instance the case of the spatial resolution and the sensitivity. Similarly, as disclosed by publication "*Study of high-energy multihole collimators*" (Andreas R. Formiconi, XP011077435), by moving the collimator away from the detector, artifacts caused by the rows of collimator channels can be minimized, but the spatial resolution will be degraded. When designing a detection device, a person skilled in the art must therefore select (specifically in function of the destination of the device) the parameter(s) that he wishes to favor to the detriment of others, or accept a compromise.

Presently, nuclear medicine departments are using mainly cameras called Anger cameras, with a detector comprising a NaI(Tl) scintillator and the collimator formed by parallel channels with hexagonal (honeycomb) section. Such device imposes a compromise between spatial resolution and sensitivity: for a source of 140 keV placed at 10 cm of the collimator, the spatial resolution is 10 mm and the sensitivity, as defined previously, is $10^{-4}$. The spatial resolution is particularly limited by the resolution of the scintillator, which is a few mm, for instance 3 mm. In addition, the image has low contrast due to mediocre energy resolution of the scintillator (10% at 140 keV).

The appearance of semi-conductor detectors, such as detectors on the basis of CdTe, CdZnTe (CZT), silicon (Si) or HgI2, has given birth to a new generation of gamma cameras. As opposed to scintillators, semi-conductors are materials with direct conversion: following the interaction of gamma rays, they create, without intermediate stage, electrical charges, in other words electron-hole pairs (electrons migrating towards the anode, the holes towards the cathode). In general, these detectors allow for the use of semi-conductor materials with thickness between a few μm and a few mm, and what is more, without the increase in thickness being accompanied by a drastic degradation of the spatial resolution.

For instance, a prototype known under the name PEGASE integrates a CZT semi-conductor detector and a collimator with parallel channels with square section, in which one hole of the collimator corresponds with one pixel of the detector. The used detector has improved energy resolution (between 3% and 5% at 140 keV, against 10% for the NaI(Tl) scintillator, which translates into a significant increase of image contrast. On the other hand, although its detector possesses better intrinsic spatial resolution, which can go for instance from 1.6 to 2.5 mm, in terms of spatial resolution and sensitivity the PEGASE prototype offers performance which is almost identical to that of Anger gamma camera.

The problem consists therefore in improving the performance of known detection devices, relative to the flux of captured photons, in other words the sensitivity (limited due to the presence of the collimator), and the spatial resolution, in order to finally break the compromise imposed since the birth of the Anger gamma camera.

To this end, the researchers have tried mainly to refine the localization, inside each pixel, of the photon interaction taking place in this pixel. As illustrated in attached FIGS. 1a and 1b, better localization of the interaction allows indeed for a reduction of the angular sector from which the detected photon originates, and consequently an improvement of the localization of the emission source.

A first method has consisted in compensating the too approximate knowledge of the place of interaction in the detector by translations of the collimator or of the detector along the X and Y directions of the detection plane. Throughout the description, the expression "detection plane" designates the frontal plane of the detector situated on the side of the collimator. The creation of a plurality of projections, corresponding to different relative positions of collimator and detector, results then, by combining the different images obtained, in an improvement of the spatial resolution. This first method was proposed with a collimator with holes having a transversal dimension (diameter, side . . . ) smaller than half the dimension of the pixels, and with a high efficiency collimator (and therefore with "large" holes). This first method is however not without inconvenient. It requires the detection device to be equipped with translations means in the detection plane according to two directions, means which are in general complex and costly. By multiplying the number of necessary projections (and or acquisitions), the acquisition time is furthermore increased, which penalizes the consultation cadence of medical imaging centers.

A second method has consisted in diminishing the size of the pixels in order to obtain a degree of pixelation greater than 1 in the detection plane. This is called over-pixelation. Throughout the description, the expression "degree of pixelation in the detection plane" designates the number of pixels extending opposite a collimator channel, according to a direction Z orthogonal to the detection plane. When this degree is greater than 1, each channel of the collimator corresponds with more than one pixel. In other terms, the transversal dimensions of the pixels are smaller than those of the collimator channels. To be noted that under "transversal dimensions of the pixels" is understood the dimensions of each pixel in the detection plane; the expression "transversal dimensions of the channels" designates the dimensions of the hole of each channel in a frontal plane of the collimator, called interior plane, which extends opposite the detection plane.

Such over-pixelation in the detection plane allows for elimination of the translations of collimator or detector in the (X, Y) plane, which were necessary in the first method, while limiting the acquisition time. Over-pixelation can be obtained physically or virtually.

We speak of physical over-pixelation when the detector presents a plurality of physical pixels opposite each collimator channel. Physical over-pixelation necessitates nevertheless multiplication of the electronic paths and can pose certain technological problems linked to the size of the physical pixels.

In a variant, it was proposed to create virtual over-pixelation in the detection plane, by virtually increasing the number of pixels of the detector. This approach, described in publication "*CZT Pixel detectors for improved SPECT imaging*" (Guillaume Montémont, XP031419399) allows for dividing each physical pixel in a plurality of virtual pixels in the (X, Y) detection plane. As disclosed by the publication "*An approach to sub-pixel spatial resolution in room temperature X-ray detector arrays with good energy resolution*" (W. K. Warburton), it is possible to determine the (x, y) coordinates of the barycenter of the cloud of charges produced by an interaction, starting from electrical signals simultaneously generated by this interaction on a plurality of adjacent anodes. It is then assumed that the interaction was detected uniquely by the virtual pixel corresponding with the coordinates of the barycenter. Without this kind of method, only the coordinates are used of the physical pixel that has collected the maximum signal. With barycentric localization, virtual pixel sizes (surfaces) can be achieved today which are one tenth of the size of physical pixels. A collimator channel faces then a plurality of virtual pixels. Compared to physical over-pixelation, virtual over-pixelation has the advantage of being accessible without multiplication of the electronic paths. It is therefore understood that over-pixelation in the detection plane corresponds with multiplication of pixels opposite a collimator channel. This over-pixelation in the detection plane can be physical or virtual, although a combination of physical over-pixelation and virtual over-pixelation can also be envisaged.

Finally, WO2008/046971 proposes to refine even more the localization of the interactions, not only by dividing each pixel in several virtual pixels in the (X, Y) detection plane, but in addition by virtually dividing the thickness of the detector material in a plurality of layers (of 1 mm thickness for instance). In other words, it involves here determining an interaction coordinate according to the Z axis. The detector becomes connected to a 3D matrix of virtual unitary detection elements, called voxels. Here also, the supplied supplementary information allows us to refine the spatial localization of the source and therefore to ameliorate the spatial resolution of the detection device.

The recent evolutions mentioned above have therefore led to detection devices with increased spatial resolution. The progress made remains however unsatisfactory considering that none of the devices proposed until now is fully using the capabilities of semi-conductors. Above all, the sensitivity of these devices remains low.

SUMMARY

The goal of the invention is to provide a photonic radiation detection device offering improved performance. In particular, the goal of the invention is to provide a detection device with higher sensitivity, while having a spatial resolution at least similar and by preference smaller (in other words better) than that of known devices. To this end, the invention is devoted mainly to supplying a detection device with lower spatial resolution in order to be able to equip the device with a higher efficiency collimator.

Another objective of the invention is to propose a detection device especially adapted to the subject application, and in particular to the part of the human body that must be analyzed (in the case of a detection device for medical camera). The specific goal of the invention is to provide the best possible detection device considering the range of spatial frequencies corresponding with the subject application. The invention extends also to a dimensioning method for a photonic radiation detection device, as well as a method of operation for such device.

First of all, it should be remembered that an object, of which the image is taken, has different spatial frequencies. The low spatial frequencies correspond with stretched out zones of homogenous gray, while the high spatial frequencies correspond with abrupt transitions of gray (for instance contours or details). The spatial frequencies of an image are usually determined by Fourier transform. It is in general assumed that the contrast of an image depends on low spatial frequencies, and the resolution depends on high spatial frequencies. Furthermore, the smaller the researched object, the more the detection device must be favoring high spatial frequencies. Depending on the subject applications, an optimized response to low spatial frequencies can be favored (sensitivity will be good, but the image will be blurred), or to high spatial frequencies (the details will then be clear, such as contours).

In cardiac imaging, the important spatial frequencies are between 0 and 1.2 $cm^{-1}$. This upper frequency limit is equivalent to a spatial resolution of approximately 9 mm, or the resolution of an Anger gamma camera. In mammography (application in which the searched for objects are smaller in size and specifically sizes smaller than 5 mm), the important spatial frequencies are between 0 and 3 $cm^{-1}$.

The invention is proposing a detection device for photonic radiation, comprising:
a collimator comprising a plurality of channels,
a detector comprising a detector material and having, on the side of the collimator, a frontal plane called detection plane,
means for determining information relative to the localization, according to X and Y directions parallel to the detection plane, of a photon interaction with the detector material, these means, called localization means in the detection plane, on the one hand, define a partitioning of the detection plane in physical or virtual pixels of transversal dimensions smaller than those of the collimator channels, and on the other hand, associate one of said pixels with each photon interaction. In other words, the localization means in the detection plane are suitable for defining over-pixelation in the detection plane, in other words a partition of said detection plane with a degree of pixelation greater than 1, and this in physical or virtual manner.

The detection device according to the invention is characterized in having, at least in a previously selected acquisition configuration, a degree of pixelation in the detection plane greater than 1 and a distance between the collimator and the detection plane, called the collimator-detector distance, greater than one tenth of the septal height of the collimator, this septal height is defined as being the maximum dimension of the collimator according to an orthogonal direction to the detection plane.

According to a preferred implementation mode, the localization means in the detection plane are suitable for defining virtual over-pixelation of the detector in the detection plane: they allow us to define a partitioning of the detection plane in virtual pixels of transversal dimensions smaller than those of the collimator channels.

This preferred implementation mode is not excluding the possibility of using localization means in the detection plane suitable for defining physical over-pixelation of the detector in the detection plane; the detector includes then a matrix of physical pixels with transversal dimensions smaller than those of the collimator channels.

The invention is based therefore on the combination of over-pixelation of the detector in the detection plane (in other words a partition of the latter in virtual or physical pixels of transversal dimensions smaller than those of the collimator channels) and a displacement between the collimator and the detection plane. In surprising manner, this combination improves significantly the spatial resolution of the detection device. This result is surprising for a person skilled in the art who, based on previous studies conducted on a non-over pixilated detector and reported in publication "*Study of high-energy multihole collimators*", would have expected that such a displacement would entail a degradation of the spatial resolution. The combination according to the invention makes the use possible of a high efficiency collimator, in other words with low septal height. This combination leads consequently to joint improvement of spatial resolution and sensitivity. The images reconstructed starting from a detection device according to the invention are at the same time sharp and contrasted.

In a first implementation form of the invention, the detection device has a fixed collimator-detector distance, which consequently is greater than one tenth ($\frac{1}{10}^{th}$) of the septal height of the collimator, and the device functions according to a method using only one acquisition configuration or using several acquisition configurations (as explained below). By preference, the collimator-detector distance is greater than $\frac{2}{10}^{th}$, or $\frac{3}{10}^{th}$, or $\frac{4}{10}^{th}$ of the septal height of the collimator.

In a second implementation mode of the invention, the detection device comprises means for adjusting the collimator-detector distance, for instance mechanical means. In this case, the device functions by preference according to a method employing several acquisition configurations corresponding with different collimator-detector distances, of which at least one is greater than one tenth of the septal height of the collimator, for instance greater than two, three or four tenths of the septal height of the collimator.

Advantageously, in at least one acquisition configuration, the collimator-detector distance is greater than 1 mm, by preference greater than 3 mm, or 5 mm.

In order to function according to a method employing several acquisition configurations (either with fixed or variable collimator-detector distance) and/or in tomographic mode, the detection device according to the invention comprises advantageously image reconstruction means suitable for determining a set of radiation data, called combined projection, allowing the reconstruction of an image of the photonic radiation source, starting from a plurality of radiation data sets, called unitary projections, each unitary projection resulting from an acquisition operation of radiation data by exposure of the detection device to the source of photonic radiation.

In planar mode, a combined projection can be determined by changing the acquisition configuration between each acquisition operation, without modifying the position of the detection device relative to the source of photonic radiation.

In tomographic mode, a combined projection is created by changing the view angle of the detection device relative to the source of photonic radiation. For each view angle, only one acquisition operation can be performed (supplying a unitary projection), or several acquisition operations (supplying several unitary projections or a combined projection) corresponding to different acquisition configurations, by preference modifying the collimator-detector distance between each acquisition operation.

According to a preferred implementation mode, the detector material is a semi-conductor material. In a variant, the detector material is a scintillator material.

Advantageously, the collimator-detector distance of the device according to the invention is smaller than the septal height of the collimator in all acquisition configurations.

By preference, the collimator has a central axis and a constant septal thickness in at least one plane orthogonal to its central axis. The expression "constant septal thickness in at least one plane" means here that the septas of the collimator have a thickness which is identical from one septa to another in this plane. By preference, the septal thickness of a collimator according to the invention is constant in any plane orthogonal to its central axis.

By preference, and in normal manner, the collimator is arranged in such way that its central axis extends perpendicularly to the detection plane. This central axis coincides with the axis of a central collimator channel, and the axial extremity of this central channel situated on the collimator side defines a plane, called interior plane of the collimator, parallel to the detection plane.

According to preferred implementation modes, the collimator is a collimator with parallel channels (this arrangement maintains a wide field of view) or diverging channels or converging channels. In a variant, it comprises a combination of parallel and non-parallel channels (converging and/or diverging), such combination can for instance correspond with collimators known as multi-focal collimators.

Advantageously, the detection device according to the invention has in addition one or more of the following characteristics:
1) the collimator channels have a square transversal section, by preference identical from one channel to another;
2) each collimator channel corresponds (in direction Z perpendicular to the detection plane) with a unique physical pixel of the detector and reciprocally; in this case, the over-pixelation in the detection plane, which is defined by the localization means in the detection plane in at least one previously selected acquisition configuration, is virtual;
3) the detection device comprises means for determining information relative to the depth of a photon interaction in the detector material, these means, called depth localization means, allow us to partition the thickness of the detector material in a plurality of virtual layers and to associate one of said layers with each photon interaction. In this case the detector becomes connected with a 3D voxel matrix. By "degree of pixelation in depth" is understood, the number of virtual layers defined by the depth localization means. On the other hand, the expression "degree of pixelation" regroups both the notions of over-pixelation in the detection plane and over-pixelation in depth: the terms "degree of pixelation" designate the number of voxels extending opposite a collimator channel.

According to a preferred implementation mode, in the case of a detection device intended for use in mammographic type applications:
1) the collimator has a septal height between 5 mm and 25 mm, by preference between 10 mm and 20 mm, for instance around 15 mm; this being the case, a collimator with septal height between 5 and 50 mm is conforming to the invention;
2) the localization means in the detection plane are suitable for defining virtual pixels with pitch between 0.1 mm and 1 mm, by preference between 0.1 mm and 0.4 mm, for instance equal to 0.2 mm;
3) the depth localization means are suitable for partitioning the detector material in at least three virtual layers,
4) the collimator-detector distance is between a fourth and a half of the septal height of the collimator, at least in a previously selected acquisition configuration; the collimator-detector distance is for instance around 5 mm when the septal height of the collimator is around 15 mm.

The invention relates also to a method for dimensioning a photonic radiation detection device, in which the detection device comprises:
a collimator comprising a plurality of channels,
a detector comprising a detector material and having, on the collimator side, a frontal plane called detection plane,
localization means in the detection plane, such as previously defined.

According to this dimensioning method:
at least one spatial frequency of interest is defined in function of the target application,
a structural model of the detection device is defined, which is determined by a set of values for the structural dimensioning parameters of collimator and detector,
at least two acquisition configurations are defined for said structural model, each acquisition configuration is determined by a collimator-detector distance and a degree of pixelation, at least one of said acquisition configurations corresponds with a collimator-detector distance greater than one tenth of the septal height of the collimator and with a pixelation degree in the detection plane greater than 1.
a merit indicator is used to represent the signal over noise ratio and/or the sensitivity and/or the spatial resolution of the detection device in function of the spatial frequency,
the value of this merit indicator is calculated for each spatial frequency of interest and for each previously defined acquisition configuration,
the obtained merit indicator values are compared, and at least one of the acquisition configurations is selected based on the results of this comparison.

It is understood, by reading the above definition, that a structural model is determined by structural parameters which, by definition, are frozen once values have been assigned to the parameters and the detection device is fabricated. These structural parameters are selected among: the septal height of the collimator, the septal thickness of the collimator, the relative arrangement of the collimator channels, the shape of the transversal section of said channels, the transversal dimensions of said channels, the frontal dimensions of the collimator, the nature of the detector material, the dimensions of the detection plane, the thickness of the detector material, the number of physical pixels of the detector, the shape of the transversal section of said physical pixels, the transversal dimensions of said physical pixels.

Inversely, the acquisition configuration for such structural model is determined by parameters (collimator-detector distance, degree of pixelation—in the detection plane and in depth—) that can be modified when using the detection device, thanks to adjustment means or corresponding electronic processing and/or data processing. To be noted that each acquisition configuration corresponds with a degree of pixelation in the detection plane and a degree of pixelation in depth. This being so, the only requirement imposed when defining the acquisition configurations in the dimensioning method according to the invention concerns the degree of pixelation in the detection plane: at least one of the defined acquisition configurations must have a degree of pixelation in the detection plane greater than 1, combined with a collimator-detector distance greater than one tenth of the septal height of the collimator.

In a preferred version of the dimensioning method according to the invention:
- a range of spatial frequencies of interest is defined in function of the target application,
- if the goal is to dimension a detection device intended to function only in one acquisition configuration, the following selection is made:
  either the acquisition configuration offering the best compromise over the whole range of spatial frequencies of interest; this configuration is for instance the configuration providing the best average of the merit indicator values, calculated over the whole range of spatial frequencies of interest,
  or the acquisition configuration providing the best merit indicator values over an essential part of the range of spatial frequencies of interest; the expression "essential part" designates here a part of the range of spatial frequencies of interest corresponding with the most interesting spatial frequencies of said range relative to the target application,
- If the goal is to dimension a detection device intended to function in several acquisition configurations, at least the two acquisition configurations are selected that provide the best merit indicator values respectively in two essential parts of the range of spatial frequencies of interest. In this way for instance, the following selection is made advantageously: the acquisition configuration providing the best merit indicator values over an upper part of the range of spatial frequencies of interest, in other words in the high frequencies, and the acquisition configuration providing the best merit indicator values over a lower part of the spatial frequencies of interest, in other words the low frequencies.

The dimensioning method according to the invention allows the comparison of several distinct structural models, in other words models corresponding with distinct sets of values for the structural parameters, in order to select the best performing among them. To this end:
- several different structural models are defined,
- for each structural model, one or more acquisition configurations are defined of said structural model, of which at least one corresponds with a collimator-detector distance greater than one tenth of the septal height of the collimator and a degree of pixelation in the detection plane greater than 1, with the clarification that at least two acquisition configurations per structural model are defined if the goal is to dimension a detection device intended to function in several acquisition configurations,
- the value of the merit indicator is calculated for each spatial frequency of interest and for each previously defined acquisition configuration, and the obtained merit indicator values are compared,
- if the goal is to dimension a detection device intended to function only in one acquisition configuration, the following selection is made:
  a. either the acquisition configuration offering the best compromise over the whole range of spatial frequencies of interest,
  b. or the acquisition configuration providing the best merit indicator values over an essential part of the range of spatial frequencies of interest.
- if the goal is to dimension a detection device intended to function in several acquisition configurations, a selection is made of the structural model and at least two of the acquisition configurations of said structural model offering the best compromise respectively over two essential parts of the range of spatial frequencies of interest (for instance in the high frequencies and in the low frequencies).

Advantageously, the used merit indicator is selected among: the indicator known as Detective Quantum Efficiency, the contrast to noise relationship; etc.

The performance of a detection device, for each spatial frequency, can indeed be measured by a merit indicator called DQE (acronym of Detective Quantum Efficiency). As disclosed by publication "*The use of Detective Quantum Efficiency (DQE) in evaluating the performance of gamma camera systems*" (Starck et al.), this indicator initially used for X ray detection devices is also suitable for gamma cameras.

The DQE is a merit indicator which has the advantage of integrating both the notions of sensitivity and spatial resolution. It translates the capacity of an imaging system for making efficient use of the input data. It is given by the equation:

$$DQE(u, v) = \frac{SNR(u, v)_{out}^2}{SNR(u, v)_{in}^2}$$

where u and v represent the spatial frequencies according to the X and Y directions respectively, and $SNR_{in}$ and $SNR_{out}$ the signal over noise ratio at input and output of the detection device. The relationship between signal and noise at the input of the detection device can be determined by the ratio of the number of photons emitted by the source at a given energy, during an acquisition (activity of the source multiplied by the branching off coefficient at the emission energy considered and for the duration of the acquisition), upon variance of the latter, with the source emission assumed to be a Poisson distribution.

The calculation of one DQE can be performed as follows:
- exposing the detection device to photonic radiation or simulation of such exposure,
- measuring the intensity of the detected signal by all or part of the voxels of the detector or simulation of this intensity measurement,
- forming a frequential representation of at least one intensity image, said intensity image representing the intensity of the measured or simulated signal by a plurality of coplanar voxels according to a plane parallel to the detection plane, assigning a sensitivity index to each frequential representation formed, this sensitivity index can be the integral of the intensities of the signals of each voxel of said image divided by the quantity of photons emitted by the source.

According to a first implementation mode, the DQE calculation comprises the following stages:

calculating the sum of a plurality of frequential representations weighted by the inverse of their respective sensitivity index, representing the calculated sum in the form of an histogram, for instance by a radial average.

In a variant, according to a second implementation mode, the DQE calculation comprises then (after the stage of assigning a sensitivity index) the following stages:

representing each frequential representation in the form of a histogram, for instance by a radial average, calculating the sum of a plurality of histograms weighted each by the inverse of the sensitivity index attributed to the frequential representation of said histogram.

In other words, it is possible to carry out the two last stages of the DQE calculation in one direction (first implementation mode) or the other (second implementation mode).

Any other merit indicator known by a person skilled in the art can be used in the framework of the dimensioning method according to the invention, as long as this indicator is suitable for representing the signal over noise ratio and/or the sensitivity and/or the spatial resolution of the detection device over the range of initially defined spatial frequencies of interest. By preference, the chosen merit indicator is suitable for representing at least the sensitivity of the detection device over a range of spatial frequencies comprised between 0 and 3 $cm^{-1}$.

The invention relates also to a method for reconstructing an image of a photonic radiation source, in which:

a photonic radiation detection device is used comprising:
  c. a collimator comprising a plurality of channels,
  d. a detector comprising a detector material and having, on the collimator side, a frontal plane called detection plane,
  e. localization means in the detection plane, such as previously defined,
the detection device is exposed to a source of photonic radiation, according to at least one view angle.

In a first version of the invention, the detection device is used in only one and the same acquisition configuration (determined by the collimator-detector distance and the degree of pixelation) corresponding with a collimator-detector distance greater than one tenth of the septal height of the collimator and a degree of pixelation in the detection plane greater than 1; this acquisition configuration was selected in advance based on the calculation results of the merit indicator values over a range of spatial frequencies of interest defined in function of the target application. During the exposure, at least one radiation data acquisition operation is performed, each acquisition operation is performed in said previously selected acquisition configuration, and each acquisition operation supplies a set of radiation data, called unitary projection. In planar mode (only one view angle), a unique unitary projection is acquired in this way. In tomographic mode, several unitary projections are acquired, namely one per view angle (all acquired projections are obtained in the same acquisition configuration). In this last case, the different unitary projections acquired, or only some among them, are then combined to form a set of radiation data, called combined projection, allowing the reconstruction of an image of the photonic radiation source.

In a second version of the invention, the detection device is used in at least two acquisition configurations. During the exposure, at least two acquisition operations of radiation data are performed in distinct acquisition configurations of the detection device (each acquisition configuration is determined by the collimator-detector distance and a degree of pixelation), at least one of said acquisition configurations corresponds to a collimator-detector distance greater than one tenth of the septal height of the collimator and a degree of pixelation in the detection plane greater than 1, said acquisition configurations were previously selected based on the calculation results of a merit value indicator over a range of spatial frequencies of interest defined in function of the target application. Each acquisition operation provides a unitary projection (such as previously defined). Several (all or only some) of the previously acquired unitary projections are then defined, to form a combined projection (such as previously defined). In planar mode, at least two unitary projections are acquired (in distinct acquisition configurations) for the unique view angle selected. In tomographic mode, one or more unitary projections can be acquired per view angle, at least two among the set of acquired projections being in distinct acquisition configurations.

Combining unitary projections in one combined projection can take place in different manners: juxtaposition of the unitary projections and matrix systems corresponding with different acquisition operations (as explained further down); utilization of wavelet transforms after reconstruction (in image) of each of the individual unitary projections: implementation of a reconstruction algorithm which will select only the frequencies of interest in each of the unitary projections during a unique reconstruction stage.

Advantageously, in the second version of the invention, a detection device is used comprising adjustment means for the collimator-detector distance, and in which the previously selected acquisition configurations correspond with different collimator-detector distances.

The present invention extends to a detection device, a dimensioning method and an image reconstruction method, characterized in combination by all or part of the characteristics described above and below.

BRIEF DESCRIPTION OF THE DRAWING

Other details and advantages of the present invention will become clear by reading the following description, which refers to the attached schematic drawings and relates to preferential implementation modes, supplied as non-limiting examples. In these drawings:

FIG. 3 is a schematic view of a section along the (X, Z) plane of a part of a detection device with the collimator placed side by side to the detector, on which is represented an interaction of a photon with the semi-conductor material;

FIG. 4 is a schematic view of a section along plane (X.Z) of a part of the detection device with the collimator at a distance from the detector, on which is shown the interaction of a photon with the semi-conductor material;

FIG. 5 is a matrix equation;

DETAILED DESCRIPTION

Figures 1A, 1B:
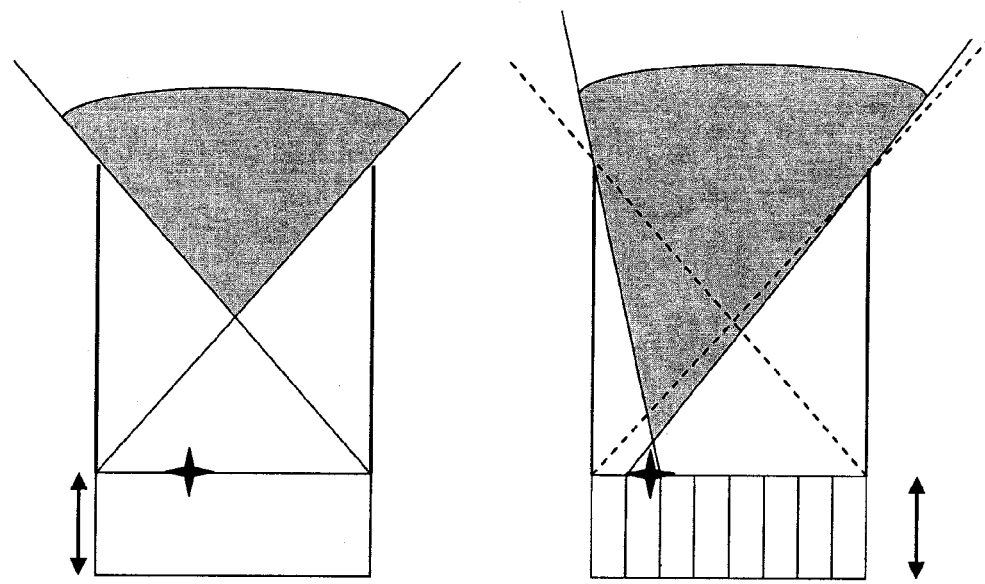
FIG. 1a is a schematic view of a channel and pixel corresponding to a current technology detection device.
FIG. 1b is a schematic view of a channel and a pixel corresponding with a current technology section device, in which the pixels are divided each in a plurality of virtual pixels.
Figure 2:
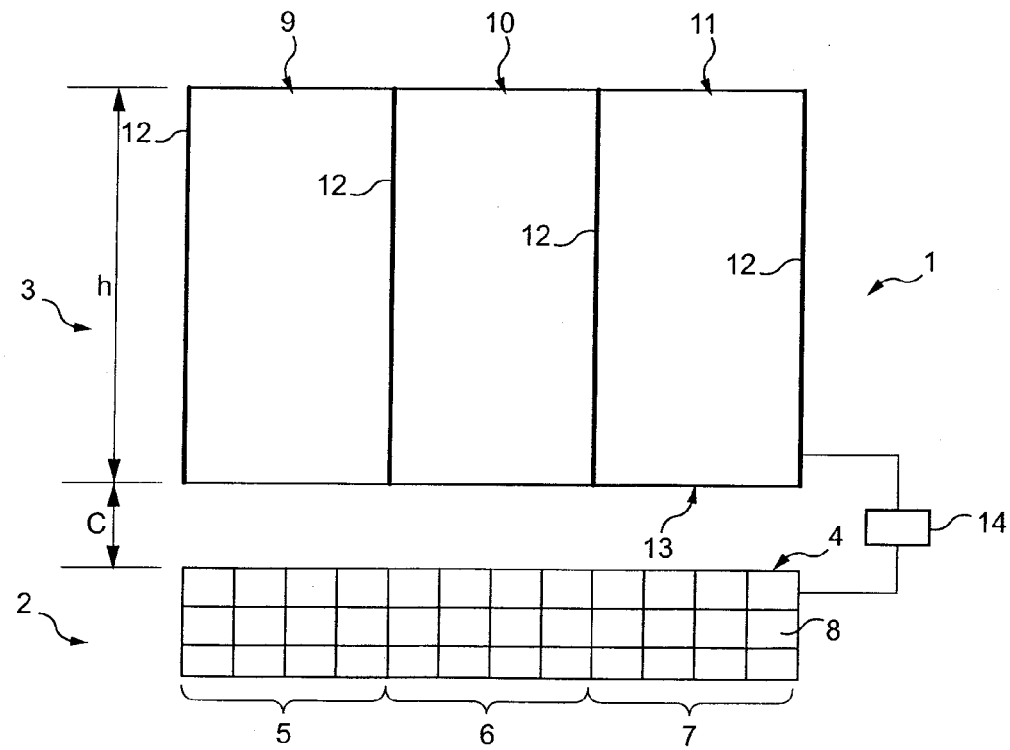
FIG. 2 is a schematic view of a section along the (X, Z) plane of a part of an implementation mode of a detection device according to the invention.

FIG. 2 illustrates in very schematic manner an implementation mode of the detection device according to the invention. Only a portion of this device is shown, in a sectional view along the (X, Z) plane. This detection device 1 comprises a semi-conductor detector 2 and a collimator 3.

Detector 2 comprises a 2D matrix of coplanar pixels 5, 6, 7 . . . . Only three of these pixels are shown on FIG. 2. These pixels form, opposite collimator 3, a frontal plane 4, called detection plane, extending in X and Y directions. The illustrated detector 2 has a square section in any plane parallel to the detection plane.

Each pixel comprises a semi-conductor material 8 with an anode and a cathode formed on each side (not shown). Each pixel constitutes in this way a unitary charge collection circuit. Such a pixel is called a physical pixel.

Detector 2 can be formed by a plurality of side by side placed elementary detectors, each elementary detector corresponds with a pixel and comprises a block of semi-conductor material, and an anode and a cathode (which are part of it). Such a detector is sometimes called a planar detector.

In a variant, detector 2 can be monolithic, which means that it comprises a single and unique block of semi-conductor material, forming the semi-conductor material of all the physical pixels. The anode formed on one face of this block of semi-conductor material is segmented in order to form a plurality of independent elementary anodes. The cathode formed on the opposite face of said block can be continuous or segmented. A physical pixel is then defined by the elementary anode and by the volume of semi-conductor material while the cathode surface extends opposite this elementary anode in direction Z, perpendicular to the detection plane. Such segmentation of the anode leads to the creation of physical pixels which are smaller in size than the physical pixels of planar detectors. The intrinsic spatial resolution of a monolithic detector is therefore in general lower (in other words better) than that of planar detectors.

Collimator 3 comprises a plurality of channels, of which three channels 9, and 11 are visible on FIG. 2. The channels of collimator 3 have all the same dimension, called height, according to direction Z. The spatial height h of collimator 3, defined as being the maximum dimension of the collimator in Z direction, is therefore equal to the height of each channel 9-11. A collimator comprising channels of different heights is nevertheless conforming to the invention.

Channels 9-11 are assembled around a central channel, which defines a central axis of the collimator. The collimator is arranged with its central axis orthogonal to detection plane 4; this central axis extends therefore in Z direction. Furthermore, the lower extremities of the channels are coplanar; they define a plane 13, called interior plane of the collimator, which is parallel to the detection plane 4. In the illustrated example, the channels of the collimator are all parallel, which gives the detection device a large view field.

The collimator channels are delimited by septas 12. These septas are formed of dense material suitable for absorbing gamma rays or X rays, such as a metal or a metallic alloy containing a heavy metal, for instance tungsten or lead. In the illustrated example, collimator 3 has a constant septal thickness in at least one plane orthogonal to its central axis, which means that the thickness of the septas is identical from one septa to another in this plane. In the present case, the illustrated collimator 3 can have a constant septal thickness in any plane orthogonal to its central axis.

In the illustrated example, all physical (and virtual) pixels of the detector and all channels of the collimator have square transversal sections, and each collimator channel corresponds with a physical pixel of the detector, and reciprocally. In other words, the pitch (width) of the physical pixels is equal to the pitch (width of the hole+septal thickness) of the channels.

According to the invention, the collimator-detector distance of the detection device, referenced c on FIG. 2, is greater than one tenth of the septal height h of the collimator, at least in one acquisition configuration of said detection device.

In a first implementation form of the invention, the detection device has a fixed collimator-detector distance. This distance is greater than one tenth of the septal height of the collimator, and by preference smaller than the septal height of the collimator, in any configuration of the detection device (when the latter is intended to function in one or several acquisition configurations).

In a second implementation form of the invention, the detection device comprises means 14 for adjusting the collimator-detector distance (schematically shown on FIG. 2), allowing variation of the distance. These means can comprise for instance a mechanism suitable for displacing the collimator away from the detector (such as a screw passing through a support flange of the collimator and a support flange of the detector) and means for measuring the collimator-detector distance in order to control the distance. The invention is not limited to the previously described adjustment means nor to mechanical adjustment means.

Such a device can function according to a method using several acquisition configurations corresponding to different collimator-detector distances. According to the invention, at least one of these acquisition configurations has a collimator-detector distance greater than one tenth of the septal height of the collimator.

The detection device according to the invention comprises in addition means, called localization means in the detection plane, suitable for determining, for each photon interaction in the semi-conductor material, information relative to said interaction in X and Y directions. These localization means in the detection plane comprise the previously defined physical pixels. In the illustrated example, they comprise in addition means for calculating, for each physical pixel and for each photon interaction in this pixel, information relative to the localization, in X and Y directions, of said interaction in said pixel, for instance by barycentric localization. With these calculation means, the detection plane can be partitioned for each physical pixel in a plurality of virtual pixels with transversal dimensions smaller than those of the collimator channels, and each photon interaction can be associated with one of said virtual pixels. Such calculation means are known by a person skilled in the art and are not shown on FIG. 2.

In other words, in the illustrated example, the localization means in the detection plane are suitable for defining virtual over-pixelation in the detection plane.

The detection device according to the invention comprises in addition optional means, called depth localization means, suitable for determining, for each photon interaction in the semi-conductor material, information relative to the localization of said interaction in Z direction. With these depth localization means a partition in depth can also be defined, in other words in Z direction, of the semi-conductor material of each pixel in a plurality of virtual layers, and each photon interaction can be associated with one of said virtual layers. These depth localization means are essentially calculation means, known by a person skilled in the art and not shown on FIG. 2.

Detector 2 therefore becomes connected with a 3D matrix of voxels, one voxel being formed by the intersection of a virtual pixel and a virtual layer. This matrix comprises in total $K=Vx*Vy*Vz$ voxels, where Vx designates the number of voxel rows in direction X, Vy designates the number of voxel rows in direction Y, and Vz designates the number of virtual layers of the material. To be noted that $Vx*Vy=PV*P$, where P designates the number of physical pixels of the detector and PV the number of virtual pixels per physical pixel. Each voxel of the detector is referenced $VD_k$ with $1 \leq k \leq K$.

Advantageously, the detection device according to the invention comprises in addition means for selecting acquisition configurations suitable for allowing a practitioner (or operator) to select one or more acquisition configurations, for instance in function of the target application and/or in view of the previously obtained images. Following the examination of an image corresponding to an area of the patient's body, it could indeed be useful to acquire new images of this area by favoring certain spatial frequencies (in other words favoring certain sizes of objects). The searched for spatial frequencies determine the acquisition configuration(s) to be selected.

The invention relates also to a method for reconstructing an image of a photonic radiation source starting from the previously described detection device. In other words, the invention relates also to an operational method for such detection device.

In normal manner, the detection device is exposed to a source of photonic radiation, such as X rays and/or gamma rays, according to at least one view angle.

According to a first version of the invention, the detection device is used, in normal manner, in only one acquisition configuration. The originality of the image reconstruction method according to the invention resides then in the characteristics of this acquisition configuration, which combines a degree of pixelation in the detection plane greater than 1 and a collimator-detector distance greater than one tenth of the septal height of the collimator. This acquisition configuration is selected in advance as explained further down in order to obtain optimal image quality.

According to this first version, during the exposure of the detection device to the photonic radiation source, one (planar mode) or several (tomographic mode) acquisition operations of radiation data are performed, as explained further down.

According to a second version of the invention, the reconstruction method uses advantageously at least two acquisition configurations. According to this second version, during the exposure, at least two acquisition operations are performed in the distinct acquisition configurations of the detection device, and each acquisition configuration is determined by a collimator-detector distance and a degree of pixelation. In planar mode, by preference only two acquisition operations are performed, in order to limit the total execution time of the method. For the same reasons, in tomographic mode, only one or two acquisition operations are performed per view angle. The used acquisition configurations were previously selected in function of the target application, which determines a range of spatial frequencies of interest, by means of a merit indicator in function of the spatial frequency. The manner in which prior selection is carried out is detailed below, in the framework of the dimensioning method according to the invention. However, it should be remembered that at least one of the selected acquisition configurations has a collimator-detector distance greater than one tenth of the septal height of the collimator and a degree of pixelation in the detection plane greater than 1 (its degree of pixelation in depth can on the other hand be equal to 1, when no overpixelation in depth is foreseen).

Each acquisition operation of radiation data comprises the following steps.

First step: a matrix is calculated, called system matrix Rj, corresponding with the acquisition configuration used in the subject acquisition operation, noted j (for instance j={1, 2} if only two acquisition operations are performed in total).

As explained previously, the detector is virtually divided in K voxels $VD_k$, with $1 \leq k \leq K$ and $K=Vx*Vy*Vz$. Similarly, the source of which the image is taken is virtually divided in I voxels $VS_i$, with $1 \leq i \leq I$.

The system matrix Rj consists of terms $r_{j-ik}$ which represent the probability that one photon emitted by the voxel $VS_i$ of the source is detected by the voxel $VD_k$ of the detector. The calculation of this system matrix Rj can be performed by means of a particle transportation code, for instance a Monte Carlo type code, for instance MCNP, or any other code developed for this purpose or any other analytic modeling. This calculation can be performed before, during or after the exposure of the detection device to the radiation source, but is by preference performed before this exposure.

As can be observed on FIGS. 3 and 4, different collimator-detector distances lead to different samplings of the information and consequently to different system matrices Rj. By modifying the collimator-detector distance, the localization of the information is modified in frequency.

Second step: the intensity of the electrical signal produced in all or part of the detector voxels during an acquisition period is determined by measurement.

The intensity measured in each voxel of the detector is represented by means of a vector Pj, where j designates the subject acquisition operation. This vector Pj is called unitary projection; it consists of terms $p_{j-k}$ with $1 \leq k \leq K$ and $K=Vx*Vy*Vz$ (number of voxel of the detector).

These two steps are performed for each acquisition operation.

If only one acquisition operation is performed (first version of the invention in planar mode), a matrix expression is obtained Pj=RjF.

When several acquisition operations are performed (first version in tomographic mode or second version of the invention), on the one hand a vector P is constructed, called combined projection, regrouping the vectors Pj (unitary projections), and on the other hand a matrix R regrouping the matrices Rj. A matrix expression is then obtained P=RF illustrated on FIG. 5. In this FIG., the matrix expression takes into account only two acquisition operations (and therefore two unitary projections); if other acquisition operations are performed, the corresponding data is incorporated subsequently in vector P and matrix R.

A combined projection is determined in this way by combination of a plurality of unitary projections which, in the second version of the invention, correspond with different acquisition configurations. The combination used here consists in juxtaposition of the acquired data (unitary projections) and the system matrices corresponding with the different acquisition operations. Other combination methods are possible.

In the above mentioned matrix expressions, vector F, consisting of terms fi with $1 \leq i \leq I$ (number of voxels of the source), represents the emission intensity of voxels $VS_i$ of the source. Therefore, an image of the source can be reconstructed by means of this vector F. The calculation of this vector F is for instance obtained by minimization of the expression (P−

RF)², according to a known iterative method of current technology (iterative algebraic methods type ART or SART, statistical iterative methods type MLEM, OSEM or MAP, etc.).

To be noted that each acquisition operation by itself can lead to the reconstruction of an image of the photonic radiation source. In the second version of the invention, the use of at least two acquisition operations (in other words of at least two unitary projections) in different acquisition configurations, including in planar mode, is not proposed here in view of alleviating a lack of radiation data by acquisition. This utilization is foreseen with the goal of improving the quality of the obtained reconstruction image, thanks to adequate selection of the acquisition configurations. This selection is employed so as to obtain both very low spatial resolution and high sensitivity.

The invention relates also to a method for dimensioning a detection device such as previously described.

According to this dimensioning method, at least one model is defined in the first place, called structural model, of the detection device. This kind of model is determined by a set of values for the structural dimensioning parameters of collimator and detector.

For the detector, the structural parameters to be defined are for instance (some parameters listed below may be redundant): the nature of the detector, and in particular the composition of the semi-conductor material; the dimensions of the detector and in particular the dimensions of the detection plane and the thickness of the semi-conductor material; the number of physical pixels; the form of the transversal section of the physical pixels (square, rectangular or any other section such as polygonal, circular . . . ) and its dimensions (when the physical pixels have a square section, it is sufficient to define their width, called pitch) etc.

For the collimator, the structural parameters to be defined are for instance (some of the parameters listed below may be redundant): the relative arrangement of the channels (parallel, divergent, convergent channels or a combination of such arrangements); the septal height; the height of each channel; the septal thickness; the shape of the transversal section of the channels (square, rectangular, hexagonal or any other section such as polygonal, circular . . . ) and its dimensions (it involves here the dimensions of the holes), etc.

In the example mentioned here, the structural model defined according to the invention is determined by the following set of parameter values:

semi-conductor material: on the basis of CdZnTe;
thickness of the semi-conductor material: 5 mm;
dimensions of the detection plane: 224 mm*224 mm;
pixel section: square, with pitch equal to 1.6 mm, consequently the detector comprising 140*140 pixels;
arrangement of the collimator channels: parallel;
septal height: 16 mm;
septal thickness: 0.15 mm;
channel section: square, with width equal to 1.45 mm (width of the hole). In other words, each channel corresponds to a pixel and reciprocally (since 1.45 mm width of the hole of the channel+0.15 mm septal thickness=1.6 mm corresponding with the pitch of the pixels).

According to the invention, at least two acquisition configurations are then defined. As previously explained, each acquisition configuration is determined by a collimator-detector distance (noted c) and a degree of pixelation. In the case of virtual over-pixelation, the definition of this degree of pixelation attributes values to the following parameters:

the number of virtual pixel rows per physical pixel in direction X, and the number of virtual pixel rows per physical pixel in direction Y;

in variant or in combination, the number PV of virtual pixels per physical pixel;

in variant or in combination, the pitch of the virtual pixels;

optionally, the number of virtual layers Vz of the semi-conductor material. In general manner, Vz is by preference chosen between 1 and 10.

According to the invention, at least one of the acquisition configurations defined in this way must have a collimator-detector distance greater than $1/10^{th}$ of the septal height of the collimator and a degree of pixelation in the detection plane greater than 1. In the here defined structural model, each physical pixel corresponds to a channel of the collimator, and the degree of pixelation in the detection plane is equal to the number PV of the virtual pixels per physical pixel.

In the illustrated example, five acquisition configurations are defined, determined by collimator-detector distances of 1 mm, 5 mm and 10 mm, and by degrees of pixelation corresponding to PV=4, 16 and 64 (three degrees of over-pixelation in the detection plane are studied) and Vz=3 (only one degree of pixelation in depth in studied). These acquisition configurations are summarized in table 1 below.

TABLE 1

| Model name | Septal height | Pitch of virtual pixels | Number of virtual pixels per pixel (PV) | Collimator-detector distance | Number (Vz) of virtual layers |
| --- | --- | --- | --- | --- | --- |
| H16_3DOI_pix4_c1 | 16 mm | 0.8 mm | 4 (or 2 × 2) | 1 mm | 3 |
| H16_3DOI_pix16_c1 | 16 mm | 0.4 mm | 16 (or 4 × 4) | 1 mm | 3 |
| H16_3DOI_pix64_c1 | 16 mm | 0.2 mm | 64 (or 8 × 8) | 1 mm | 3 |
| H16_3DOI_pix64_c5 | 16 mm | 0.2 mm | 64 (or 8 × 8) | 5 mm | 3 |
| H16_3DOI_pix64_c10 | 16 mm | 0.2 mm | 64 (or 8 × 8) | 10 mm | 3 |

As previously indicated, all these acquisition configurations correspond with the same structural model and have therefore the same septal height. On the other hand, they comprise the same number of virtual layers Vz. Nevertheless, these two parameters are indicated in table 1 above because they distinguish the referred configurations from the models described in table 2 below, called control models.

To be noted also that, to the extent that only one structural model of the detection device was defined in the framework of this example, all the acquisition configurations of table 1 have the same physical pixel pitch. Therefore, the parameters "pitch of virtual pixels" and "number of virtual pixels per pixel" translate the same geometric characteristic.

According to the invention, the DQE is then calculated of each of the acquisition configurations so defined, over a range of spatial frequencies of interest. This calculation is done assuming, in first approximation, that the noise is stationary and according to a Poisson distribution. The range of spatial frequencies of interest selected here is the range $[0; 3\ cm^{-1}]$, suitable for mammography.

For each acquisition configuration, the DQE calculation comprises the following steps.

First step: simulation of the exposure of the acquisition configuration to a point source, for instance centered relative to the collimator and situated at a predetermined distance of the latter (noted collimator-detector distance), during a given exposure time.

The choice of the source-collimator distance is dictated by the target application. For a mammographic application, this distance is by preference between 1 cm and 5 cm. It is around 10 cm in cardiac imaging. In the illustrated example, the simulated source-collimator distance is 5 cm. This distance corresponds in fact to the average thickness of a breast and is furthermore the most critical. It is also possible to simulate several exposures, at different source-collimator distances.

The simulation of the exposure of the acquisition configuration to a point source is done by particle transport code, for instance a type of code known under the name Monte Carlo, for instance the MCNP code or the Gate code. This code simulates the position of the interactions in all the voxels of the detector. Other types of codes can be used, such as deterministic codes, for instance the code known under the name Sindbad (see publication "*Combination of high resolution analytically computed uncollided flux images with low resolution Monte-Carlo computed scattered flux images*" of J. Tabary, R. Guillemaud and F. Mathy, IEEE Trans. Nucl. Sci. 51-1 212-217, 2004).

By preference, the simulated point source is an isotope used in nuclear medicine, for instance $^{99m}$Tc (source emitting mono energetic photons of 140 keV energy). In the illustrated example, a source with an activity of 740 MBq is simulated, the exposure time is 10 minutes.

Second step: for each virtual layer z of the detector material, PV images $I_{z,n}$ are obtained, each image $I_{z,n}$ representing the intensity (gray scale) of the electrical signal detected in the voxels of the detector referenced VD-z-n, with $1 \leq z \leq Vz$ and $1 \leq n \leq PV$. Said voxels VD-z-n correspond with the intersection of the z layer and a virtual pixel with index n. The index n defines the relative position of the pixels facing the same channel. In other words, the index n defines the position of each virtual pixel (or physical pixel in case of physical over-pixelation) relative to the channel opposite to it. The detector counts as many virtual pixels with index n, and therefore voxels VD-z-n, as physical pixels. By preference, the indexation is done in identical manner for all groups of pixels (each group corresponds to a channel). In other words, all pixels with the same relative position relative to the channel they are facing are referenced by the same index value.

Third step: a frequential representation of each image $I_{z,n}$ is determined, for instance by Fourier transform of each image $I_{z,n}$, which is noted TF $I_{z,n}$. In this way, Vz×PV Fourier transforms TF $I_{z,n}$ are obtained with $1 \leq z \leq Vz$ and $1 \leq n \leq PV$.

Each image TF $I_{z,n}$ is a matrix of frequencies, of which each term (u,v) represents the intensity of the signal corresponding to the spatial frequencies u (in direction X) and v (in direction Y) of image $I_{z,n}$.

Fourth step: a weighted sum is made of the square of the module of each frequential representation TF $I_{z,n}$ obtained in the preceding step.

The weight factor of each frequential representation is equal to $1/S_{z,n}$, where $S_{z,n}$ is equal to the total number of interactions estimated in the index n voxels of layer z (voxels VD-z-n), divided by the number of photons emitted by the source. The coefficient $S_{z,n}$ can be called sensitivity of the voxels with index n of layer z. It corresponds with a sensitivity index associated with the frequential representation TF $I_{z,n}$.

The following 2D frequential representation (or frequential image) is then obtained:

$$DQEimage = \sum_{z=1}^{Vz} \sum_{n=1}^{PV} \frac{1}{S_{z,n}} \times |TFI_{z,n}|^2$$

Fifth step: the DQE is determined of the acquisition configuration by constructing a frequency histogram of the frequential representation DQEimage obtained in the preceding step, this value is then by preference divided by the number of photons emitted by the source, at the considered energy, during the simulation (or acquisition).

This histogram is obtained starting from the matrix DQEimage by summation of the intensities of each term (u,v) corresponding to the same spatial frequency independently of the axes. For all spatial frequencies $f=\sqrt{u^2+v^2}$, the value of the histogram is the sum of the intensities of the elements (u,v) of DQEimage of which the coordinates (u,v) are such that $\sqrt{u^2+v^2}=f$. By preference, this sum of intensities can be normalized by the number of points with coordinates (u,v) so that $\sqrt{u^2+v^2}=f$. The histogram corresponds then to the radial average of the frequential representation 2D DQE image.

The obtained histogram, called DQE, is representative of the sensitivity and of the spatial resolution of the detection device, in function of the spatial frequency.

The fourth and fifth steps can be reversed. In this case, a histogram is made of the square module of each frequential representation TF $I_{z,n}$ by calculating the radial average, then the sum is made of Vz*PV histograms obtained in this way weighted by previously defined weighting factors $1/S_{z,n}$.

For the purpose of verification of the technical effect on which rests the inventive concept common to the detection device, the dimensioning method and the image reconstruction method according to the invention, the inventor has also simulated control models, such as described in table 2 below. All the structural dimensioning parameters of these control models that are not shown in table 2 are identical to those of the acquisition configurations of table 1.

TABLE 2

| Model name | Septal height | Pitch of virtual pixels | Number of virtual pixels per pixel (PV) | Collimator-detector distance | Number of virtual layers |
|---|---|---|---|---|---|
| Ref_LEHR | 29 mm | 1.6 mm | 1 | 1 | 1 |
| H16_1DOI_c1 | 16 mm | 1.6 mm | 1 | 1 mm | 1 |
| H16_1DOI_c10 | 16 mm | 1.6 mm | 1 | 10 mm | 1 |

The DQE of each of these control models was calculated over the range of spatial frequencies [0; 3 cm$^{-1}$], as previously indicated for the acquisition configurations of table 1.

To be noted that the model named Ref_LEHR disposes of a conventional collimator with septal height equal to 29 mm and consequently with good spatial resolution (LEHR is the acronym of Low-Energy High-Resolution). This control model Ref_LEHR is called the reference model. The goal of the invention is to provide detection devices that surpass the reference model. The acquisition configurations defined in table 1 have lower septal height than this reference model. It is therefore expected that they will offer a gain in sensitivity, which was confirmed by tests. It is also expected that these acquisition configurations will lead to a degradation of the resolution, translating in a lower DQE specifically at high frequencies. Against all expectations, this degradation does not occur, as shown below.

Figure 6:
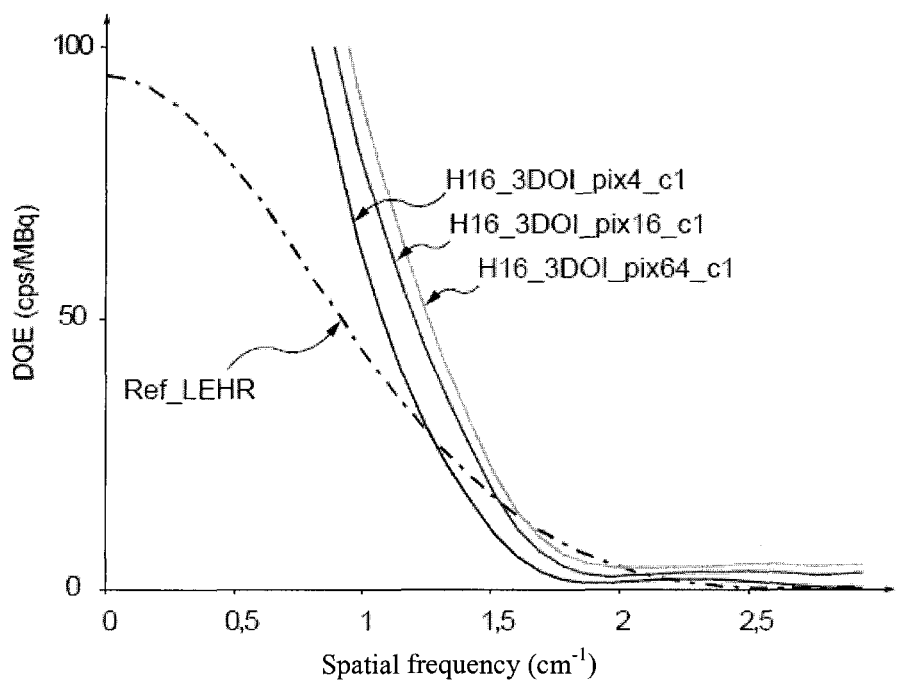
FIGS. 6 to 8 are DQE curves in function of the spatial frequency.
Figure 7:
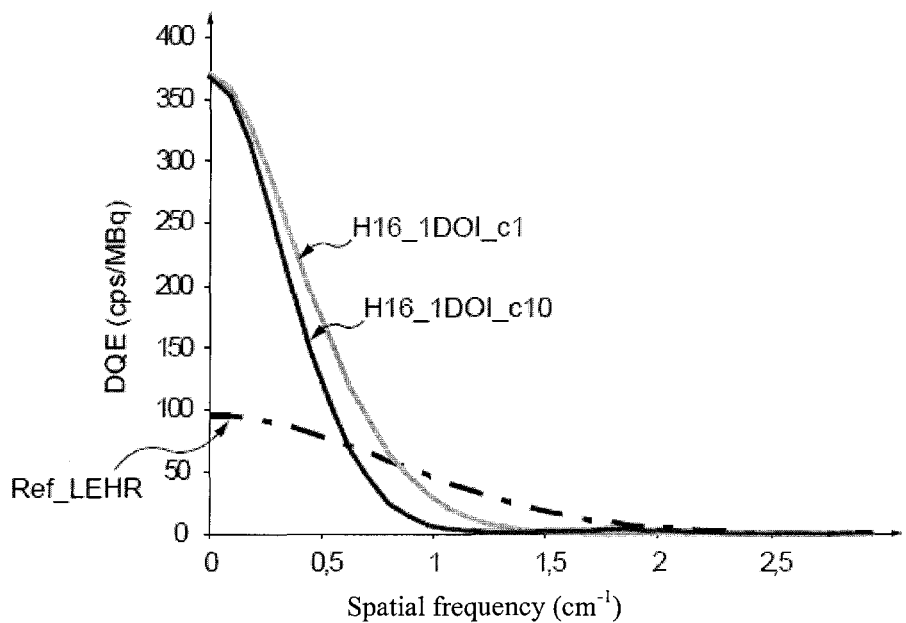
Figure 8:
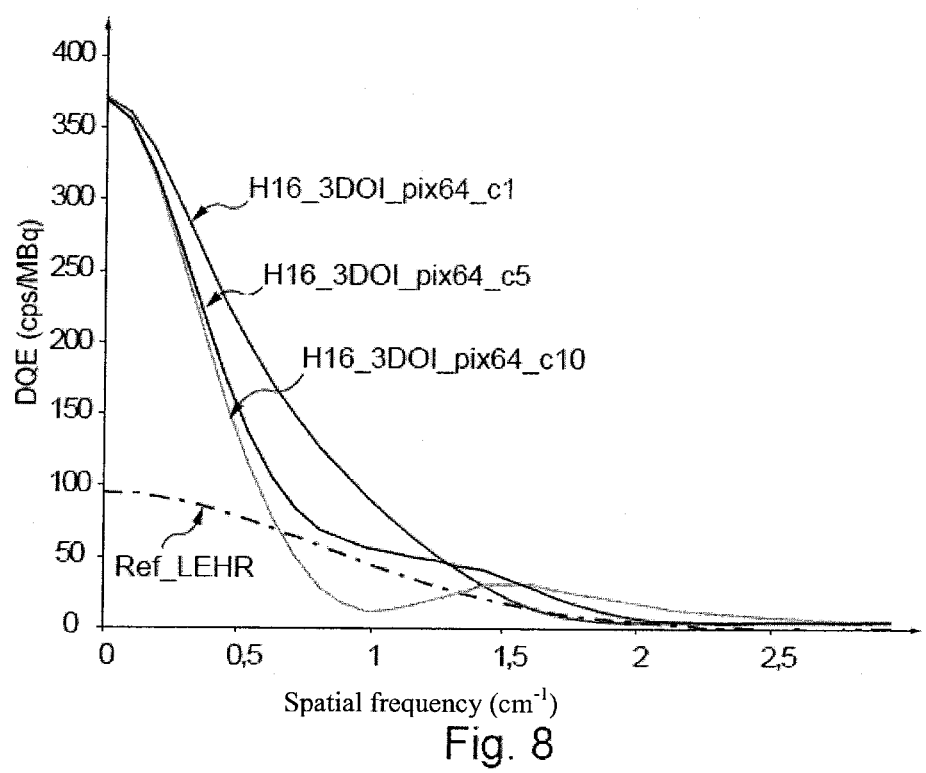

The calculated DQE for the acquisition configurations (table 1) defined in the framework of the dimensioning method according to the invention and for the control models (table 2) are represented on FIGS. 6 to 8. The zero frequency DQE (DQE value for f=0) represents the sensitivity of the detection device. At the other frequencies, the DQE must be as high as possible in order for the quality of the images reconstructed at this frequency to be the best possible.

FIG. 6 shows the DQE of the acquisition configurations H16_3DOI_pix4_c1, H16_3DOI_pix16_c1, H16_3DOI_pic64_c1 and of the reference model (Ref_LEHR). The comparison of these curves allows us to analyze the effect of over-pixelation on the quality of the reconstructed image (the degree of pixelation in the detection plane is the only parameter with different values between the first three configurations), and to compare the obtained results with those of the reference model. It is observed that the DQE increases with the degree of pixelation over the whole range of spatial frequencies of interest. In addition, over-pixelation results in offering a better performing detection device at high frequencies (specifically greater than 2.2 $cm^{-1}$) than the reference model. Furthermore, the higher the degree of pixelation, the more the spatial frequencies zone where the DQE of the model with over-pixelation is inferior to that of the reference model is reduced. With a collimator with septal height of 16 m, a better (by a factor of 4) sensitivity (DQE at zero frequency) is obtained than with the reference collimator with a height of 29 mm, which was expected. Moreover, thanks to the over-pixelation in the detection plane (regardless of its degree), a resolution gain relative to the reference model is also obtained. In this way, more sensitive and higher resolution detection devices than the reference model are achieved.

FIG. 7 shows the DQE of control models H16_1DOI_c1, H16_1DOI_c10 and reference model (Ref_LEHR). As observed when reading table 2, for these three control models, no over-pixelation is performed, neither in the detection plane, nor in depth. In other words: the minimum partition of the detection plane of these three control models corresponds with the pitch of the physical pixels of the acquisition configurations of table 1, which is equal to 1.6 mm. The information regarding the depth of each photon interaction is not taken into account in these models, which leads back to the fact that the detector material comprises only one layer (virtual and physical), while the configurations of table 1 have three. Therefore, the comparison of the DQE curves of these three control models allows us to analyze the effect, in the absence of over-pixelation, of the displacement between the collimator and the detection plane on the quality of the reconstructed image (the collimator-detector distance is the only parameter of which the values differ between the two first models), and to compare the obtained results with those of the reference model. It is observed that the DQE of the H16_1DOI_c1 model (model with small displacement) is greater than that of the model H16_1DOI_c10 (model with larger displacement), and this over the whole range of spatial frequencies considered. In the absence of over-pixelation in the detection plane, there is therefore no benefit in increasing the collimator-detector distance. These results are in line with those expected by a person skilled in the art. They explain that until today no one would have imagined that the performance of a detection device could be improved by moving the collimator away from the detection plane by more than $^{1}/_{10}{}^{th}$ of the septal height of the collimator.

FIG. 8 shows the DQE of the reference model and the DQE of the acquisition configurations H16_3DOI_pix64_c1, H16_3DOI_pix64_c5 and H16_3DOI_pix64_c10 defined in the framework of the dimensioning method according to the invention. The comparison of these curves allows us to analyze the effect, in case of over-pixelation (to a high degree), of the displacement between the collimator and the detection plane on the quality of the reconstructed image (the collimator-detector distance is the only parameter of which the values differ between the three acquisition configurations considered), and to compare the obtained results with those of the reference model. It is observed that a collimator-detector distance equal to 5 mm (ref. H16-3DOI_pix64_c5) allows us to be above the curve of the reference model over the whole range of spatial frequencies. In addition it suppresses the hollows observed in the curves of the DQE models with higher collimator-detector distance (ref. H16_3DOI_pix64_c10). Finally, this distance of 5 mm offers better quality of the reconstructed image than that obtained with 1 mm displacement (ref. H16_3DOI_pix64-c1) for frequencies greater than 1.3 $cm^{-1}$. However, for spatial frequencies smaller than 1.3 $cm^{-1}$, the best performing model is the one with a collimator-detector distance equal to 1 mm (H16_3DOI_pix64_c1). Inversely, beyond 1.6 $cm^{-1}$, the model offering the best image quality is the one with a collimator-detector distance equal to 10 mm (H16_3DOI_pix64-c10).

From these observations can be deduced that the combination of over-pixelation and displacement between the collimator and the detector plane results in the use of a collimator with lower septal height, and therefore with higher efficiency, without degradation of the spatial resolution. In unexpected manner, a very distinct improvement of this resolution is obtained even at high frequencies.

It is also understood, when examining FIG. 8, that an adjustment of the collimator-detector distance allows for the adaptation of the detection device sensitivity to the targeted spatial frequencies.

In the framework of the dimensioning method according to the invention, the DQE of all previously defined acquisition configurations are compared.

Two options are then possible, depending on whether a detection device is desired that will function in one or more acquisition configurations.

If a detection device is desired that functions only in one acquisition configuration, a selection is made of:
1) either the acquisition configuration offering the best compromise relative to the quality of the reconstructed image (such as represented by the DQE) over the whole range of spatial frequencies of interest; for instance, the acquisition configuration is selected having the highest average DQE (over the whole range); or
2) the acquisition configuration offering the highest DQE over an essential part of the range of spatial frequencies of interest. In mammography, the upper part of the range is then favored (high frequencies).

In the illustrated example, the configuration H16_3DOI_pix64_c5 is selected advantageously, which offers the best compromise over the whole range of spatial frequencies of interest while guaranteeing, at high frequencies, good image quality, close to the configuration H16_3DOI_pix64_c10 and at all events greater than the reference model.

If a detection device is desired functioning in at least two acquisition configurations, by preference a selection is made of at least:
1) the acquisition configuration offering the highest DQE at high frequencies, 2) the acquisition configuration offering the highest DQE at low frequencies.

This type of selection puts a detection device at the disposal suitable for creating images that are both precise and contrasted.

Based on tests conducted by the inventor, these two configurations correspond in general with different collimator-detector distances. Therefore, the detection device dimensioned in this way must be equipped with means for adjusting the collimator-detector distance. It is however not totally excluded, according to the considered structural model, that these acquisition configurations can correspond with collimator-detector distances that are identical but with different degrees of over-pixelation. The detection device would in this case have a fixed collimator-detector distance (greater than one tenth of the septal height of the collimator) and could therefore be deprived of means for adjusting this distance, but would function for instance with two acquisitions per view angle processed with different degrees of pixelation.

In the illustrated example, the two acquisition configurations to be selected correspond respectively with configurations H16_3DOI_pix64_c10 and H16_3DOI_pix64_c1, which have different collimator-detector distances (and identical degrees of pixelation). With the configuration H16_3DOI_pix64_c10, of which the collimator-detector distance is equal to 10 mm, the best image quality is obtained for spatial frequencies greater than $1.6$ $cm^{-1}$. With the configuration H16_3DOI_pix64_c1, with collimator-detector distance equal to 1 mm, the best image quality is obtained for spatial frequencies smaller than $1.3$ $cm^{-1}$. These two configurations offer moreover very good image quality (better than the reference model) for frequencies between $1.3$ $cm^{-1}$ and $1.6$ $cm^{-1}$.

In the framework of the dimensioning method according to the invention, it is possible to define in advance several different structural models.

For each structural model, at least one acquisition configuration is then defined having a collimator-detector distance greater than $1/10^{th}$ of the septal height of the collimator and a degree of pixelation in the detection plane greater than 1. By preference, for each structural model at least two acquisition configurations are defined with different collimator-detector distance (one of which greater than one tenth of the septal height of the collimator).

The DQE of each defined acquisition configuration is then calculated (for each structural model), and the calculated DQE's are compared.

If the goal is to create a detection device intended to function in only one acquisition configuration, the rest of the method is identical to that implemented when only one structural model is defined initially. A selection is made between, either the acquisition configuration offering the best compromise over the whole range of spatial frequencies of interest, or the acquisition configuration offering the highest DQE over an essential part of the range of spatial frequencies of interest. This being done, a structural model is also selected.

If the goal is to create a detection device functioning in at least two acquisition configurations, a selection is made at least of the acquisition configurations offering respectively the highest DQE at high frequencies and at low frequencies, with the reservation that these acquisition configurations correspond with the same structural model. In the opposite case, a selection is made advantageously of the structural model and at least two acquisition configurations of said model offering the best compromise respectively at high frequencies and low frequencies.

The invention can be the object of numerous variants relative to the illustrated implementation modes, since these variants fall within the scope of the claims.

In particular, the detector material can be a scintillator material. To be noted, in this case, that the detection device is deprived of localization means in depth (Vz is then equal to 1.

On the other hand, in tomographic mode, it is possible to use two (or more) detection devices according to the invention with distinct acquisition configurations and specifically with different collimator-detector distances, and to proceed with only one acquisition operation per view angle for each detection device, then combining the unitary projections acquired by the two detection devices. This reduces the total acquisition time.

The invention claimed is:

1. A dimensioning method for a photonic radiation detection device, wherein the detection device comprises:
    a collimator comprising a plurality of channels;
    a detector comprising a detector material having a frontal plane defined as a detection plane on a collimator side of the detector; and
    localization means in the detection plane for determining information relative to a localization, in X and Y directions parallel to the detection plane, of photon interactions with the detector material, that define a partitioning of the detection plane in physical or virtual pixels with transversal dimensions smaller than those of the collimator channels, and that associate one of the pixels with each photon interaction;
    the method comprising:
    defining at least one spatial frequency of interest as a function of a target application;
    defining a structural model of the detection device, which is determined by a set of parameter values for structural dimensioning of the collimator and the detector;
    defining at least two acquisition configurations of the structural model, each acquisition configuration is determined by a collimator-detector distance and a degree of pixelation, at least one of the acquisition configurations corresponds with a collimator-detector distance greater than one tenth of a septal height of the collimator and a degree of pixelation in the detection plane greater than 1;
    using a merit indicator representing one or more of a signal over noise ratio or a sensitivity or a spatial resolution of the detection device as a function of the spatial frequency;
    calculating a value of the merit indicator for each spatial frequency of interest and for each of a previously defined acquisition configuration; and
    comparing the merit indicator values, and selecting at least one of the acquisition configurations based on results of the comparison.

2. The dimensioning method according to claim 1, wherein;
    a range of spatial frequencies of interest is defined as a function of the target application,
    where dimensioning a detection device to function in only one acquisition configuration, a selection is made of:
    either, the acquisition configuration offering a best compromise over a range of spatial frequencies of interest,
    or the acquisition configuration providing a best merit indicator value over an essential part of the range of spatial frequencies of interest,
    where dimensioning a detection device to function in several acquisition configurations, a selection is made of at least two acquisition configurations providing a best merit indicator value respectively over two essential parts of the range of spatial frequencies of interest.

3. The dimensioning method according to claim 2, wherein the acquisition configuration is selected providing a best merit indicator value over an upper part of the range of spatial frequencies of interest, and the acquisition configuration providing a best merit indicator value over a lower part of the range of spatial frequencies of interest.

4. The dimensioning method according to claim 1, wherein:
defining several different structural models for each structural model, where one or several acquisition configurations are defined of which at least one corresponds with a collimator-detector distance greater than one tenth of the septal height of the collimator and with a degree of pixelation in the detection plane greater than 1;
calculating the merit indicator value for each spatial frequency of interest and for each previously defined acquisition configuration, and comparing the obtained merit indicator values;
where dimensioning a detection device to function in only one acquisition configuration, a selection is made of:
either the acquisition configuration offering a best compromise over a range of spatial frequencies of interest,
or the acquisition configuration providing a best merit indicator value over an essential part of the range of spatial frequencies of interest,
where dimensioning a detection device to function in several acquisition configurations, a selection is made of the structural model and at least two acquisition configurations of the structural model offering a best compromise respectively over two essential parts of the range of spatial frequencies of interest.

5. The dimensioning method according to claim 1, wherein using a merit indicator comprises using one of: a Detective Quantum Efficiency or a contrast to noise ratio.

6. The dimensioning method according to claim 1, wherein defining a set of parameter values for structural dimensioning of the collimator and the detector comprises defining one of more of: the septal height of the collimator, a septal thickness of the collimator, a relative arrangement of the collimator channels, a shape of a transversal section of the channels, transversal dimensions of the channels, frontal dimensions of the collimator, a nature of the detector material, dimensions of the detection plane, a thickness of the detector material, a number of physical pixels of the detector, a shape of a transversal section of the physical pixels, or transversal dimensions of the physical pixels.

7. An image reconstruction method for a source of photonic radiation, in which a photonic radiation detection device is used, the device comprising:
a collimator comprising a plurality of channels,
a detector comprising a detector material and having a frontal plane defined as a detection plane on the collimator side of the detector,
localization means in the detection plane for determining information relative to a localization, in X and Y directions parallel to the detection plane, of a photon interaction with the detector material, that define a partitioning of the detection plane in physical or virtual pixels with transversal dimensions smaller than those of the collimator channels, and that associate one of the pixels with each photon interaction,
the method comprising exposing the detection device exposed to a source of photonic radiation, according to at least one view angle,
wherein, during the exposure, at least one acquisition operation of radiation data is performed, each acquisition operation is performed in the same acquisition configuration corresponding with a collimator-detector distance greater than one tenth of a septal height of the collimator and a degree of pixelation in the detection plane greater than 1, where the acquisition configuration is selected in advance based on calculation results of a merit indicator value over a range of spatial frequencies of interest defined by a function of the target application, each acquisition operation providing a set of radiation data, defined as a unitary projection.

8. An image reconstruction method for a source of photonic radiation, in which a photonic radiation detection device is used, the device comprising:
a collimator comprising a plurality of channels,
a detector comprising a detector material and having a frontal plane defined as a detection plane on the collimator side of the detector,
localization means in the detection plane for determining information relative to a localization, in X and Y directions parallel to the detection plane, of a photon interaction with the detector material that define a partitioning of the detection plane in physical or virtual pixels of transversal dimensions smaller than those of the collimator channels, and that associate one of the pixels with each photon interaction,
the method comprising exposing the detection device to a source of photonic radiation, according to at least one view angle, wherein
during the exposure, at least two radiation data acquisition operations are performed in distinct acquisition configurations of the detection device, at least one of the acquisition configurations corresponds with a collimator-detector distance greater than one tenth of the septal height of the collimator and a degree of pixelation in the detection plane greater than 1, where the acquisition configurations are selected in advance based on a calculation results of a merit indicator value over a range of spatial frequencies of interest defined as a function of a target application, each acquisition operation providing a set of radiation data, defined as a unitary projection, and
several of previously acquired unitary projections are combined, to form a set of radiation data, defined as a combined projection, allowing image reconstruction of the source of photonic radiation.

9. The image reconstruction method according to claim 8, further comprising using a detection device comprising means for adjusting the collimator-detector distance, and a previously selected acquisition configuration that corresponds to different collimator-detector distances.

* * * * *